United States Patent [19]

Estes

[11] Patent Number: 5,661,208
[45] Date of Patent: Aug. 26, 1997

[54] RUBBER AND VINYL PROTECTANT

[75] Inventor: Tara Nicole Estes, Midland, Mich.

[73] Assignee: Dow Corning Corporation, Midland, Mich.

[21] Appl. No.: 513,584

[22] Filed: Aug. 11, 1995

[51] Int. Cl.$^6$ ............................ C08J 3/02; B05D 3/02
[52] U.S. Cl. ............... 524/457; 524/461; 524/588; 427/387; 427/385.5; 427/393.5; 106/2; 106/11; 106/287.11; 252/312
[58] Field of Search .................... 427/387, 385.5, 427/393.5; 524/837, 457, 588, 461; 106/2, 11, 287.11; 252/312

[56] References Cited

U.S. PATENT DOCUMENTS

| | | | |
|---|---|---|---|
| 5,017,221 | 5/1991 | LeGrow et al. | 106/2 |
| 5,217,758 | 6/1993 | Greenleaf et al. | 427/387 |
| 5,227,200 | 7/1993 | LeGrow | 427/387 |

FOREIGN PATENT DOCUMENTS

| | | |
|---|---|---|
| 459500 | 12/1991 | European Pat. Off. . |
| 463431 | 1/1992 | European Pat. Off. . |

*Primary Examiner*—Karen A. Dean
*Attorney, Agent, or Firm*—James L. DeCesare

[57] ABSTRACT

A dry, non-oily, non-greasy, rubber or vinyl surface protectant contains a silicone component and an acrylic component in its formulation. When only the silicone component is applied to rubber and vinyl surfaces, the surfaces become glossy but feel oily. When only the acrylic component is applied, they are glossy and feel dry but are tacky and draggy as if a heavy residue was present. When components are blended and applied to rubber and vinyl surfaces, the surfaces have a dry shine with good gloss and feel completely dry. The treated surfaces are also not tacky and give no sensation of heavy residue presence.

5 Claims, No Drawings

RUBBER AND VINYL PROTECTANT

BACKGROUND OF THE INVENTION

This invention is directed to a method of applying a protective and beautifying finish to a rubber or vinyl substrate, of the type commonly used in automotive vehicle upholstery, interior and exterior trim, and pneumatic tires.

As evidenced by U.S. Pat. Nos. 5217758 (Jun. 8, 1993) and 5227200 (Jul. 13, 1993), silicones can be useful components in formulations for treating rubber and vinyl automotive surfaces. While these patented formulations are beneficial in many applications, there is an ever present need for improvement in the level of oiliness and greasiness. Thus, consumers point to oiliness and greasiness of residues left behind by current protectants as a major source of dissatisfaction.

My invention is based on the discovery that a dry, non-oily, and non-greasy rubber or vinyl surface protectant can be provided by combining certain silicone components and acrylic components in a formulation. I verified that when only the silicone component was applied to rubber and vinyl surfaces, the surfaces were glossy, but they felt oily. When only the acrylic component was applied to the surfaces, they were glossy and felt dry but were tacky and draggy, as though some heavy residue were still present. In some cases, the surfaces were white and flaky.

However, when I blended the silicone and acrylic components, and applied the blend to the rubber and vinyl surfaces, a dry shine resulted exhibiting good gloss and a completely dry feeling. The surfaces were non-tacky, and gave no heavy residue sensation. In addition, the blended composition offers protection against the deleterious effects of ozone, which can otherwise cause degradation of unprotected rubber and vinyl surfaces.

SUMMARY OF THE INVENTION

The object of my invention is to provide a method of protecting rubber or vinyl substrates by applying a protectant composition containing a silicone component and an acrylic component. The silicone component is an aqueous emulsion containing a polydimethylsiloxane stabilized in the aqueous emulsion by a nonionic surfactant. The silicone component can also be an aqueous emulsion or microemulsion containing an emulsion polymerized polydimethylsiloxane stabilized in the aqueous emulsion or microemulsion by a nonionic surfactant and an ionic surfactant. The acrylic component is an acrylic polymer emulsion, acrylic polymer solution, acrylic polymer colloidal solution, acrylic polymer dispersion, or acrylic polymer colloidal dispersion. The acrylic component and the silicone component are blended together to yield a silicone polymer/acrylic polymer ratio of 10:90 to 90:10 on a weight basis, preferably a ratio of 25:75 to 75:25, and most preferably a ratio of 50:50.

These and other features and objects of my invention will become apparent from a consideration of the detailed description.

DETAILED DESCRIPTION OF THE INVENTION

The silicone component of the rubber or vinyl substrate protectant composition is an aqueous emulsion or microemulsion of a polydimethylsiloxane stabilized in the emulsion by one or more ionic or nonionic surfactants. These emulsions can be prepared mechanically or by emulsion polymerization.

The siloxane in the aqueous emulsion or microemulsion can be a linear or branched chain siloxane fluid having a viscosity of about 100–300,000 mm²/s (cS) at 25° C. Most useful are siloxane polymers and copolymers having a viscosity in the range of about 300–60,000 mm²/s, most preferably about 350–15,000 mm²/s. A mixture of siloxanes having relatively higher and relatively lower viscosities can also be employed.

Such polysiloxanes contain the characteristic difunctional repeating "D" unit:

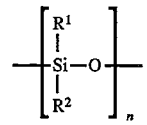

in which n is greater than 1; and $R^1$ and $R^2$ are each independently alkyl radicals containing 1–7 carbon atoms or a phenyl group. Illustrative siloxanes are polydimethylsiloxane, polydiethylsiloxane, polymethylethylsiloxane, polymethylphenylsiloxane, and polydiphenylsiloxanes. Preferably, the siloxane is trimethylsiloxy-terminated, but it can include hydroxy-endblocking as well.

While the siloxane can contain "D" units other than dimethylsiloxane, such as diphenyl siloxane or methylphenyl siloxane, from the standpoint of economics, siloxane polymers with dimethylsiloxane "D" units —[$(CH_3)_2SiO$]— are most preferred. Yet, in some instances, it might be appropriate for $R^1$ or $R^2$ to be another functional group, such as an aminoalkyl, carboxyalkyl, haloalkyl, acrylate, acryloxy, acrylamide, or vinyl group, for example. Silicone glycol copolymers can also be used, and such compounds are described in various U.S. Pat. Nos. including 3402192, 4122029, 4218250, 5136068, and 5302382.

One suitable mechanical emulsion is a composition containing a trimethylsiloxy-terminated polydimethylsiloxane stabilized by a nonionic surfactant. The siloxane is present in the emulsion in the form of particles having a diameter greater than 140 nanometers (0.14 micrometer) but less than 350 nanometers (0.35 micrometer), most preferably less than 300 nanometers 0.3 micrometer). These emulsions can be prepared by mechanical processes described in U.S. Pat. No. 5017221 (May 21, 1991) and EP 463431 (Jan. 2, 1992), for example.

According to such processes, water, one or more nonionic surfactants, and the siloxane, are simply mixed together, and homogenized using a laboratory homogenizer or other device for applying vigorous agitation. These mechanical emulsions typically have a pH of 7–9.5, and contain 10–80% by weight of the siloxane, preferably 20–60%, 0.01–15% by weight of the nonionic surfactant(s), the balance being water.

Emulsion polymerization can also be used to prepare suitable aqueous emulsions or microemulsions containing polydimethylsiloxanes, stabilized in the emulsions by a nonionic surfactant and an ionic surfactant. The siloxane is present in the microemulsion as particles having a diameter of less than 140 nanometers (0.14 micrometer), preferably less than 50 nanometers (0.05 micrometer). Fine emulsions contain a siloxane as particles with a diameter of 140–300 nanometers (0.14–0.30 micrometer). Standard emulsions contain a siloxane as particles with a diameter greater than 300 nanometers (0.30 micrometer). These emulsions can be prepared by emulsion polymerization processes described in EP 459500 (Dec. 4, 1992) for example.

According to that process, stable, oil-free polysiloxane emulsions and microemulsions are prepared by mixing a cyclic siloxane, a nonionic surfactant, an ionic surfactant, water, and a condensation polymerization catalyst. The mixture is heated and agitated at a polymerization reaction temperature until essentially all of the cyclic siloxane is reacted, and a stable, oil-free emulsion is formed. The emulsions typically have a pH of 6–7.5, and contain 10–70% by weight of the siloxane polymer, preferably 25–60%, 0.5–30% by weight of the nonionic surfactant, 0.05–30% by weight of the ionic surfactant, preferably 0.5–20%, the balance being water.

Any conventional nonionic surfactant can be used to prepare the emulsions and microemulsions. For example, one suitable type of nonionic emulsifier is an ethoxylated fatty alcohol. Such fatty alcohol ethoxylates contain the characteristic —$(OCH_2CH_2)_aOH$ group attached to a fatty hydrocarbon residue of about 8–20 carbon atoms such as lauryl ($C_{12}$), cetyl ($C_{16}$) and stearyl ($C_{18}$). Integer "a" can be 1–100 but is more typically 12–40.

Examples of commercial products include various polyoxyethylene fatty alcohols sold under the tradename BRIJ by ICI Americas Incorporated, Wilmington, Del.; the tradename. EMERY by the Henkel Corporation/Emery Group, Ambler, Pa.; the trademark ETHOSPERSE® by Lonza Incorporated, Fairlawn, N.J.; and the trademark PROMULGEN® by the Amerchol Corporation, Edison, N.J.

One useful nonionic surfactant is BRIJ 35 Liquid. This polyoxyethylene (23) lauryl ether has an HLB value of about 16.9 and the formula $C_{12}H_{25}(OCH_2CH_2)_{23}OH$. Laureth-23 is the International Nomenclature Cosmetic Ingredient (INCI) name assigned by The Cosmetic, Toiletry, and Fragrance Association, Washington, D.C., (CTFA), to polyoxyethylene (23) lauryl ether. Laureth-23 is also sold under the trademark AMEROXOL® LE-23 by the Amerchol Corporation, Edison, N.J.; the tradename EMTHOX 5877 by the Henkel Corporation/Emery Group, Ambler, Pa.; the trademark MACOL® LA-23 by PPG/Mazer, Gurnee, Ill.; and the trademark WITCONOL® 5964 by the Witco Corporation, New York, N.Y.

Other useful polyoxyethylene fatty alcohols are polyoxyethylene (4) lauryl ether (LAURETH-4), polyoxyethylene (2) cetyl ether (CETEARETH-2), polyoxyethylene (10) cetyl ether (CETEARETH-10), polyoxyethylene (20) cetyl ether (CETEARETH-20), polyoxyethylene (2) stearyl ether (STEARETH-2), polyoxyethylene (10) stearyl ether (STEARETH-10), polyoxyethylene (20) stearyl ether (STEARETH20), polyoxyethylene (21) stearyl ether (STEARETH-21), polyoxyethylene (100) stearyl ether (STEARETH-100), polyoxyethylene (2) oleyl ether (OLETH-2), polyoxyethylene (10) oleyl ether (OLETH-10), and polyoxyethylene (20) oleyl ether (OLETH-20).

Some suitable commercial nonionic surfactants are ethoxylated alcohols sold under the trademark TERGITOL®, and ethoxylated alkyl phenols sold under the trademark TRITON® by Union Carbide Corporation, Danbury, Conn. Similar products are sold as NEODOL® by Shell Chemical Company, Houston, Tex.; MACOL® by PPG Industries, Gurnee, Ill.; and TRYCOL by Henkel Corporation, Ambler, Pa.

Another useful nonionic surfactant for preparing emulsions according to my invention is ISOLAURETH-6, which is CTFA's INCI designation for the polyethylene glycol ether of branched chain aliphatic 12 carbon alcohols conforming to the formula $C_{12}H_{25}(OCH_2CH_2)_6OH$. In preparing emulsions with this surfactant, a small amount of an anionic surfactant such as a sodium salt of an alkylaryl polyether sulfate may be included.

In addition, fatty acid alkanolamides or amine oxides can be used. Fatty acid alkanol amide surfactants include fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide. Representative commercial products are sold under the trademark WITCAMIDE® by Witco Corporation, New York, N.Y.

Amine oxide surfactants include N-alkyl amine oxides such as N-cocodimethylamine oxide, N-lauryl dimethyl amine oxide, N-myristyl dimethylamine oxide, and N-stearyl dimethylamine oxide; N-acyl amine oxides such as N-cocamidopropyl dimethylamine oxide and N-tallow amidopropyl dimethylamine oxide; and N-alkoxyalkyl amine oxides such as bis(2-hydroxyethyl) $C_{12-15}$ alkoxypropylamine oxide. Other amine oxide surfactants are lauric acid diethanolamide, N-lauryl dimethylamine oxide, coconut acid diethanolamide, myristic acid diethanolamide, and oleic acid diethanolamide. Commercial products are sold under tradenames and trademarks such as AMMONYX by the Stepan Company, Northfield, Ill.; BARLOX® by Lonza Incorporated, Fairlawn, N.J.; and MACKAMINE by The Mcintyre Group Limited, University Park, Ill.

Sorbitan derivatives sold under the tradenames SPAN and TWEEN by ICI Americas Incorporated, Wilmington, Del.; and propylene oxide-ethylene oxide block polymers sold under the trademark PLURONIC® by BASF Corporation, Parsippany, N.J.; may also be employed. Silicone glycol copolymers can also be used as a nonionic surfactant.

The ionic surfactant used to prepare the microemulsion can be any conventional anionic emulsifier including sulfonic acids and their salt derivatives. Some useful anionic surfactants are alkali metal sulforicinates; sulfonated glyceryl esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alpha-naphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having one or more alkyl groups of 8 or more carbon atoms. Commercial anionic surfactants include alkylarylsulfonates such as dodecylbenzenesulfonic acid sold under the tradename BIOSOFT S-100 by the Stepan Company, Northfield, Ill.

The ionic surfactant can also be any conventional cationic emulsifier used in emulsion polymerization. Such cationic surfactants include fatty acid amines, amides, and their salts. Suitable cationic surfactants are exemplified by aliphatic fatty amines and their derivatives such as dodecylamine acetate, octadecylamine acetate, and acetates of the amines of tallow fatty acids; homologues of aromatic amines having fatty chains such as dodecylanalin; fatty amides derived from aliphatic diamines such as undecylimidazoline; fatty amides derived from di-substituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethyl sterarylamide; amine salts of long chain fatty acids; quaternary ammonium bases derived from fatty amides of di-substituted diamines such as oleylbenzylaminoethylene diethylamine hydrochloride; quaternary ammonium bases of benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as condensation products of stearic acid and diethylene triamine; polyethylene diamines; and polypropanol polyethanolamines. Examples of commercial cationic surfactants are those products sold under the tradenames ARQUAD T-27W, ARQUAD 16–29, ARQUAD C-33, ARQUAD T-50, ETHOQUAD T/13 ACETATE, by AKZO Chemicals, Inc., Chicago, Ill.

The acrylic component of my rubber or vinyl substrate protectant composition is an acrylic polymer emulsion, acrylic polymer solution, acrylic polymer colloidal solution, acrylic polymer dispersion, or acrylic polymer colloidal dispersion. By acrylic polymer, I intend to include homopolymers, copolymers, and terpolymers, of one or more monomers having ethylenic unsaturation. Suitable monomers are, for example, (i) olefinically unsaturated carboxylic acid monomers, (ii) acrylate or methacrylate ester monomers, or (iii) unsaturated aromatic monomers.

Some representative olelinically unsaturated carboxylic acid monomers suitable for my invention are acrylic acid, methacrylic acid, crotonic acid, and tiglic acid. Representative acrylate or methacrylate ester monomers are methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, ethyl tiglate, methyl crotonate, and ethyl crotonate. Representative unsaturated aromatic monomers are styrene, alpha-methylstyrene, alpha-ethylstyrene, divinylbenzene, and vinyltoluene.

Acrylic polymer emulsions, solutions, colloidal solutions, dispersions, and colloidal dispersions, are available commercially under the trademark JONCRYL® from S. C. Johnson & Son, Inc., of Racine, Wis.

One representative acrylic component of my invention is Johnson's JONCRYL® aqueous solution containing 30% by weight of an acrylic resin. The acrylic resin has a molecular weight of about 12,500. The solution is amber-colored, and has a viscosity of 3500–7000 mm$^2$/s, a pH of 7.9–8.6, a glass transition temperature of 73° C., and an acid number based on solids of 213.

Another representative acrylic component of my invention is Johnson's JONCRYL® emulsion containing a terpolymer of methacrylic acid/styrene/n-butyl acrylate in a 35/55/10 ratio, with a 25% non-volatile solids content, an acid number of 226–236 based on a two gram sample, and a viscosity of less than 20 mPa.s. Similar emulsions are also available from other companies which contain terpolymers of methacrylic acid/styrene/n-butyl acrylate, as milky-white emulsions with a viscosity of 600–1500 mm$^2$/s, a pH of 7.3–8.5, a 45% non-volatile solids content, and a glass transition temperature of 47° C.

A third representative acrylic component of my invention is Johnson's JONCRYL® rheology controlled emulsion of styrene-acrylic acid polymer. It is a milky-translucent liquid containing a nonionic surfactant. It has a viscosity of 700 mm$^2$/s, a pH of 8.5, a glass transition temperature of 75° C., and an acid number based on solids of 50.

S. C. Johnson & Son, Inc. markets a variety of acrylic polymer products suitable for my invention in the form of acrylic polymer emulsions, acrylic polymer solutions, acrylic polymer colloidal solutions, acrylic polymer dispersions, and acrylic polymer colloidal dispersions.

Representative of their products, in addition to the three JONCRYL® products noted above, are JONCRYL® 56 an aqueous acrylic resin solution containing 27% acrylic polymer, 13.5% isopropyl alcohol, having a viscosity of 2500 mm$^2$/s, a glass transition temperature of 60° C., a pH of 9.1, and an acid number based on solids of 108; JONCRYL® 61 an aqueous acrylic resin solution containing 35% acrylic polymer, 7.5% ammonium hydroxide, 1.5% ethylene glycol, 5.0% isopropyl alcohol, 51% water, and a pH of 8.3–8.6; JONCRYL® 80 a styrenated acrylic polymer emulsion having a molecular weight determined by weight average of greater than 200,000, a glass transition temperature of −30° C., and a minimum film forming temperature of less than 70° C.; JONCRYL® 95 a colloidal dispersion containing 30% of a styrenated acrylic polymer having a molecular weight determined by weight average of less than 50,000, a viscosity of 100 mm$^2$/s, a glass transition temperature of 43° C., a minimum film forming temperature of 20° C., a pH of 8.1, and an acid number based on solids of 70; JONCRYL® 142 a colloidal dispersion containing 39.5% acrylic resin polymer, having a viscosity of 25 mm$^2$/s, a glass transition temperature of −7° C., a minimum film forming temperature of 10° C., a pH of 6, and an acid number based on solids of 128; JONCRYL® 537 a rheology controlled emulsion containing 46% acrylic/styrene copolymer, having a viscosity of 150 mm$^2$/s, a glass transition temperature of 44° C., a minimum film forming temperature of 42° C., a pH of 9, and an acid number based on solids of 40; and JONCRYL® SCX-2560 a rheology controlled emulsion containing 48.5% acrylic resin polymer, having a viscosity of 500 mm$^2$/s, a glass transition temperature of −11° C., a minimum film forming temperature of less than 5° C., a pH of 8.3, and an acid number based on solids of 50. The density of these products typically varies from 8.4–8.9 pounds per gallon (1007–1066 kilograms per cubic meter).

Other companies market similar acrylic-based polymer products, such as Reichhold Chemicals, Inc. of Durham, N.C., under their trademark AROLON®; and Rohm & Haas Company, Philadelphia, Pa., under their trademark RHOPLEX®.

My silicone and acrylic component containing protectant composition is applied to a rubber or vinyl surface to be treated by dispensing it in the form of a fine or coarse mist, with a pump or trigger spray, or in an aerosol container. The wetted surface is then wiped with an absorbent cloth to ensure complete coverage and uniform distribution of the composition. The surface is allowed to dry or it can be dried by light buffing with a clean absorbent cloth. The protectant can also be applied manually by pouring it onto a cloth and wiping the surface.

My protectant composition may include other common adjuvants found in such products including an antifoam agent, preservative, dye or coloring agent, corrosion inhibitor, freeze-thaw additive, ultraviolet absorber, antimicrobial agent, plasticizer, or coalescing solvent such as ethylene glycol, propylene glycol, or butylene glycol.

My invention is illustrated in more detail by reference to the following examples.

In these examples and the accompanying Tables 1–3, "Silicone Microemulsion" refers to an aqueous microemulsion containing an emulsion polymerized trimethylsiloxy-terminated polydimethylsiloxane having a viscosity of about 15,000 mm²/s. The siloxane was stabilized in the microemulsion by a nonionic surfactant and an anionic surfactant, and had a diameter of less than 140 nanometers (0.14 micrometer). The microemulsion contained 22% by weight of the siloxane, and was a clear yellow fluid with a pH of 6–7.5.

"Silicone Emulsion" refers to an aqueous emulsion containing a trimethylsiloxy-terminated polydimethylsiloxane having a viscosity of about 350 mm²/s. The siloxane was stabilized in the emulsion by a nonionic surfactant, and had a diameter in excess of 140 nanometers (0.14 micrometer). The emulsion contained 60% by weight of the siloxane, and had a pH of 7–9.5.

"Acrylic Solution" refers to an aqueous amber-colored solution containing 30% by weight of acrylic resin with a molecular weight of 12,500. The solution had a viscosity of 3500–7000 mm²/s, a pH of 7.9–8.6, a glass transition temperature of 73° C., and an acid number based on solids of 213.

"Acrylic Terpolymer Emulsion" refers to an emulsion containing 45% by weight of a methacrylic acid/styrene/n-butyl acrylate terpolymer. The emulsion was milky-white and had a viscosity of 600–1500 mm²/s, a pH of 7.3–8.5, and a glass transition temperature of 47° C.

"Acrylic RC Emulsion" refers to a rheology controlled (RC) emulsion containing 49% by weight of a styrene-acrylic acid polymer stabilized in the emulsion with a nonionic surfactant. It was a milky-translucent liquid with a viscosity of 700 mm²/s, a pH of 8.5, a glass transition temperature of 75° C., and an acid number based on solids of 50.

EXAMPLE - EVALUATION PROCEDURE

After formulation, all test materials were allowed to equilibrate for at least 15 minutes at ambient conditions (65°–80° F., 15–60% Relative Humidity) before they were evaluated. A 600 microliter dose of test material was applied to a 3 inch by 6 inch coupon of black Sierra automotive replacement vinyl using a 100–1000 microliter capacity Eppendorf pipette. The test material was worked into a uniform film on the surface of the vinyl coupon using a 3 inch by a 3 inch square of 100% .cotton knit cloth. The wetting and spreading properties of the liquid blend were observed and recorded during the application process. The film was allowed to dry under ambient conditions (65°–80° F., 15–60% R. H.) for 15 minutes. Then, film gloss was rated by comparing it to the gloss of films of two commercially available vinyl protectants. Commercial Protectant "A" was a high gloss protectant while Commercial Protectant "B" was a very high gloss protectant. A gloss meter could not be used to generate meaningful gloss measurements because of the highly textured surface of the vinyl substrate. Therefore, visual comparisons to the Commercial Protectants "A" and "B" were used to rate the gloss of the blends. Next, the tactile profile of the film was evaluated. The tactile attributes evaluated were tackiness, smeariness, slip/drag, dryness, and residue transfer, in that order. One finger (first or index) was used to tap the film with firm pressure 2 or 3 times while observing the amount of force required to release the finger from the film. The amount of tack on a scale from 1–5 was recorded. Smeariness was rated next by rubbing a finger back and forth across the film a few times while observing the degree of marking or smearing of the film. The degree of smearing on a scale of 1–5 was recorded. Slip/drag of the film was rated by rubbing a finger across the film a few times and observing the ease or lack of ease with which the finger moved across the film. The degree of slip or drag of the film on a scale of 1–5 was recorded. To evaluate film dryness, a finger was rubbed across the film several times while observing how dry the film felt between the finger and the substrate, recording a rating on a scale of 1–5. Finally, residue transfer was evaluated by rubbing a finger 10 times across the film along the length of the substrate then rubbing the same finger 10 times across the width of an untreated substrate. The amount of residue transferred from the treated coupon to the finger to the untreated substrate was rated on scale of 1–5 and recorded.

Tactile Rating Scales are shown below:
Dryness
 Rating=1. Feels very dry. Does not feel oil, greasy, waxy or resinous.
 Rating=5. Feels very oil, greasy, waxy, or resinous.
Residue Transfer
 Rating=1. No residue transferred to untreated vinyl.
 Rating=5. Very large quantity of residue transferred to untreated vinyl.
Tackiness
 Rating=1. Not tacky. Like untreated vinyl.
 Rating=5. Very tacky. Like vinyl treated with lanolin.
Smeariness
 Rating=1. Not smeary. No marks left after tapping or rubbing.
 Rating=5. Very smeary. Mattes out when rubbed, or other obvious marks left when tapped or rubbed.
Slip/Drag
 Rating=1. Slick, smooth, slippery. Low friction. Very little resistance to light rubbing.
 Rating=5. Very draggy. High friction. High resistance to light rubbing.

EXAMPLE - BLENDS OF SILICONE MICROEMULSION/ACRYLIC SOLUTION

EXAMPLE 1A - 25/75 Weight Ratio of Silicone Polymer/Acrylic Polymer

Five grams of Silicone Microemulsion (22% non-volatile silicone) were added to a one ounce glass vial. Fifteen grams of Acrylic Solution diluted to 20% solids were added to the same vial, and the two materials were mixed with gentle agitation by inverting the vial 50 times. This blend yielded a silicone polymer/acrylic polymer ratio of about 25/75 on a weight basis. The test material was evaluated according to the procedure described above. The results are shown in Table 1. This blend had superior overall performance compared to either of the starting components. It resulted in a film with better gloss and appearance than the Acrylic Solution alone and a drier feel and less residue transfer than the Silicone Microemulsion alone.

EXAMPLE 1B - 50/50 Weight Ratio of Silicone Polymer/Acrylic Polymer

Ten grams of Silicone Microemulsion (22% non-volatile silicone) were added to a one ounce glass vial. Ten grams of Acrylic Solution diluted to 20% solids were added to the same vial, and the two materials were mixed with gentle agitation by inverting the vail 50 times. This blend yielded a silicone polymer/acrylic polymer ratio of about 50:50 on a weight basis. The test material was evaluated according to the procedure described above. The results are shown in Table 1. This blend had superior overall performance compared to either of the starting components. It resulted in a film with much better gloss and appearance than the Acrylic Solution alone and a drier feel and less residue transfer than the Silicone Microemulsion alone.

EXAMPLE 1C - 75/25 Weight Ratio of Silicone Polymer/Acrylic Polymer

Fifteen grams of Silicone Microemulsion (22% non-volatile silicone) were added to a one ounce glass vial. Five grams of Acrylic Solution diluted to 20% solids were added to the same vial, and the two materials were mixed with gentle agitation by inverting the vial 50 times. This blend yielded a silicone polymer/acrylic polymer ratio of about 75/25 on a weight basis. The test material was evaluated according to the procedure described above. The results are shown in Table 1. This blend had better but not superior overall performance compared to either of the starting components. It resulted in a film with much better gloss and appearance than the Acrylic Solution alone and a drier feel and somewhat less residue transfer than the Silicone Microemulsion alone. However, the film was more tacky and smeary than with either component alone.

In Examples 1A-1C, the Silicone Microemulsion alone resulted in a film with very good gloss but a very poor tactile profile. It had very good application properties. The Acrylic Solution alone resulted in a film with fair gloss and a very good tactile profile except in the slip/drag category. The film felt quite draggy which was undesirable. The Acrylic Solution had good application properties, but it left a slightly streaky film after drying.

As can be seen from Examples 1A-1C, the Silicone Microemulsion and the Acrylic Solution can be blended in different ratios to achieve different film properties. For purpose of obtaining a film with maximum gloss and dryness and minimum residue transfer, tackiness, smeariness and dragginess, the best ratio of silicone polymer/acrylic polymer appeared to be 50/50 with these two particular silicone and acrylic components. Film properties can be altered to a limited degree by changing the silicone polymer/acrylic polymer ratio. In blends of Silicone Microemulsion and Acrylic Solution, increasing the amount of silicone polymer favorably impacts gloss and slip/drag, while increasing the amount of acrylic polymer favorably impacts residue transfer, tackiness and smeariness. Incorporating Acrylic Solution so that anywhere from 25% to 75% of the acrylic polymer is present yields very dry feeling films.

EXAMPLE-BLENDS OF SILICONE EMULSION/ ACRYLIC TERPOLYMER EMULSION

EXAMPLE 2A - 25/75 Weight Ratio of Silicone Polymer/Acrylic Polymer

Five grams of Silicone Emulsion diluted to 20% silicone were added to a one ounce glass vial. Fifteen grams of Acrylic Terpolymer Emulsion diluted to 20% solids were added to the same vial, and the two materials were mixed with gentle agitation by inverting the vial 50 times. This blend yielded a silicone polymer/acrylic polymer ratio of about 25/75 on a weight basis. The test material was evaluated according to the procedure described above. The results are shown in Table 2. This blend had better overall performance compared to either of the starting components. It produced a film with less tackiness, smeariness, and dragginess, than the Acrylic Terpolymer Emulsion alone, and a drier feel, less residue transfer, and slightly higher gloss, than the Silicone Emulsion alone.

EXAMPLE 2B - 50/50 Weight Ratio of Silicone Polymer/Acrylic Polymer

Ten grams of Silicone Emulsion diluted to 20% silicone were added to a one ounce glass vial. Ten grams of the Acrylic Terpolymer Emulsion diluted to 20% solids were added to the same vial, and the two materials were mixed with gentle agitation by inverting the vial 50 times. This blend yielded a silicone polymer/acrylic polymer ratio of about 50/50 on a weight basis. The test material was evaluated according to the procedure described above. The results are shown in Table 2. This blend had better overall performance compared to either of the starting components. It resulted in a film with much less tackiness, smeariness, and dragginess, and better application properties, than the Acrylic Terpolymer Emulsion alone, and a drier feel, slightly less residue transfer, and slightly higher gloss, than the Silicone Emulsion alone.

EXAMPLE 2C-75/25 Weight Ratio of Silicone Polymer/Acrylic Polymer

Fifteen grams of Silicone Emulsion diluted to 20% silicone were added to a one ounce glass vial. Five grams of the Acrylic Terpolymer Emulsion diluted to 20% solids were added to the same vial, and the two materials were mixed with gentle agitation by inverting the vial 50 times. This blend yielded a silicone polymer/acrylic polymer ratio of about 75/25 on a weight basis. The test material was evaluated according to the procedure described above. The results are shown in Table 2. This blend had better overall performance compared to either of the starting components. It resulted in a glossy film with much less tackiness, smeariness, and dragginess, and much better application properties, than the Acrylic Terpolymer Emulsion alone, and a drier feel, and slightly less residue transfer, than the Silicone Emulsion alone.

In Examples 2A-2C, the Silicone Emulsion alone resulted in a film with good gloss but a poor tactile profile. It had good application properties. The Acrylic Terpolymer Emulsion alone resulted in a film with very good gloss but a silvery/white tint which is undesirable. It had very poor application properties.

As can be seen from Examples 2A-2C, the Silicone Emulsion and the Acrylic Terpolymer Emulsion can be blended in different ratios to achieve different film properties. For purpose of obtaining a film with maximum gloss, dryness, and minimum residue transfer, tackiness, smeariness and dragginess, the 50/50 and 75/25 ratios of silicone polymer/acrylic polymer provide the best overall performance with these two particular silicone and acrylic components. Film properties can be altered to a limited degree by changing the silicone polymer/acrylic polymer ratio. In blends of the Silicone Emulsion and the Acrylic Terpolymer Emulsion, increasing the amount of silicone polymer favorably impacts tackiness, smeariness and dragginess. Incorporating the Acrylic Terpolymer Emulsion so that anywhere from 25% to 75% of the acrylic polymer is present yields very dry feeling films.

EXAMPLE - BLENDS OF SILICONE MICROEMULSION/ACRYLIC RC EMULSION

EXAMPLE 3A - 25/75 Weight Ratio of Silicone Polymer/ Acrylic Polymer

Five grams of Silicone Microemulsion (22% non-volatile silicone) were added a one ounce glass vial. Fifteen grams of Acrylic RC Emulsion diluted to 20% solids were added to the same vial, and the two materials were mixed with gentle agitation by inverting the vial 50 times. This blend yielded a silicone polymer/acrylic polymer ratio of about 25/75 on a weight basis. The test material was evaluated according to the procedure described above. The results are shown in Table 3. This blend had superior overall performance compared to either of the starting components. It resulted in a glossy film with better application properties and less dragginess than the Acrylic RC Emulsion alone, and a much drier feel, much less residue transfer, and less tackiness, than the Silicone Microemulsion alone.

EXAMPLE 3B - 50/50 Weight Ratio of Silicone Polymer/Acrylic Polymer

Ten grams of Silicone Microemulsion (22% non-volatile silicone) were added to a one ounce glass vial. Ten grams of Acrylic RC Emulsion diluted to 20% solids were added to the same vial, and the two materials were mixed with gentle agitation by inverting the vial 50 times. This blend yielded a silicone polymer/acrylic polymer ratio of about 50/50 on a weight basis. The test material was evaluated according to the procedure described above. The results are shown in Table 3. This blend had superior overall performance compared to either of the starting components. It resulted in a glossy film with better application properties and less dragginess than the Acrylic RC Emulsion alone, and a much drier feel, less residue transfer, and less tackiness, than the Silicone Microemulsion alone.

EXAMPLE 3C - 75/25 Weight Ratio of Silicone Polymer/Acrylic Polymer

Fifteen grams of Silicone Microemulsion (22% non-volatile silicone) were added to a one ounce glass vial. Five grams of Acrylic RC Emulsion diluted to 20% solids were added to the same vial, and the two materials were mixed with gentle agitation by inverting the vial 50 times. This blend yielded a silicone polymer/acrylic polymer ratio of about 75/25 on a weight basis. The test material was evaluated according to the procedure described above. The results are shown in Table 3. This blend had slightly improved overall performance compared to the Silicone Microemulsion alone, but did not perform better overall than the Acrylic RC Emulsion.

In Examples 3A-3C, the Silicone Microemulsion alone resulted in a film with very good gloss but a very poor tactile profile. It had very good application properties. The Acrylic RC Emulsion alone resulted in a film with very good gloss and a very good tactile profile except in the slip/drag category. The film felt quite draggy which was undesirable. Also, the Acrylic RC Emulsion alone had very poor application properties.

As can be seen from Examples 3A-3C, the Silicone Microemulsion and the Acrylic RC Emulsion can be blended in different ratios to achieve different film properties. For purpose of obtaining a film with maximum gloss, dryness, and minimum residue transfer, tackiness, smeariness, and dragginess, the best ratio of silicone polymer/acrylic polymer appeared to be 25/75 with these two particular silicone and acrylic components. Film properties can be altered to a limited degree by changing the silicone polymer/acrylic polymer ratio. In blends of the Silicone Microemulsion and the Acrylic RC Emulsion, increasing the amount of silicone polymer favorably impacts gloss and application properties, while increasing the amount of acrylic polymer favorably impacts all of the tactile characteristics.

These examples demonstrate that acrylic polymers can be incorporated into water-based vinyl protectant formulations along with silicone polymers or copolymers, to provide protectants that produce protective and beautifying films on substrates typically found in automobile interiors, i.e. vinyl; rubber; and plastics such as acrylonitrile-butadiene-styrene (ABS), polycarbonate, polyurethane, and polyolefins. The films had good gloss and good tactile profiles as evident from Tables 1-3. Good gloss is considered gloss equivalent to or better than gloss achieved with Commercial Protectant A. Good tactile profile is considered one that is dry, non-residue transferring, non-tacky, non-smeary, and non-draggy.

While many vinyl and rubber protectants contain silicone emulsions, and produce protective and beautifying films with good gloss, the films feel oily or greasy. By incorporating acrylic polymers with silicones in my protectants, I achieve protective and beautifying films with good gloss, yet the films are dry and do not feel oily or greasy.

Depending on selection of particular acrylic and silicone polymers, gloss of the film can be varied. Film gloss and other properties of the protectant film such as wetting can also be varied and improved by incorporating additional adjuvants. Thus, wetting agents such as alkanolamides can be added to the protectant blend to improve its wetting property to make application easier. Where a particular silicone/acrylic protectant blend produces a very dry but low gloss film, one can add a coalescing solvent; a plasticizer such as butyl benzyl phthalate, heptyl nonyl adipate, dibutyl sebacate, or epoxidized soya oil; a styrene-maleic anhydride (SMA) copolymer resinous film former; or fluorosurfactants sold under the tradename FLUORAD by 3M Company, St. Paul, Minn.; to improve film formation of the acrylic polymer and gloss of the deposited film.

TABLE 1

Example 1

| Sample Description | Application and Appearance Comments | Dryness | Residue Transfer | Tackiness | Smeariness | Slip/Drag | Additional Tactile Comments |
|---|---|---|---|---|---|---|---|
| Silicone Microemulsion | Very good wetting. Gloss same as or better than Commercial Protectant B. | 5 | 5 | 2 | 3 | 2 | Noticeable tap and rub marks left, but they heal fairly quickly. Feels oily/greasy. Large quantity of residue transfer. |
| Acrylic Solution | Very good wetting. Slightly streaky after drying. Some gloss, but less than Commercial Protectant A. Hazy-white look to film. | 1 | 1 | 1 | 1 | 3 | Very dry feel. No residue transfer. Very draggy at first, then less so after continued rubbing. |
| Example 1A Blend 25/75 silicone/acrylic | Very good wetting. Gloss better than Commercial Protectant A. | 1 | 1 | 1 | 1 | 1-2 | Very dry feel. Almost no residue transfer. |
| Example 1B Blend 50/50 silicone/acrylic | Very good wetting. Gloss equal to or slightly better than Commercial Protectant B. | 1 | 2 | 2 | 1 | 1 | Very dry feel. Slight residue transfer. Slight marring with a very hard rub. |

TABLE 1-continued

Example 1

| Sample Description | Application and Appearance Comments | Dryness | Residue Transfer | Tackiness | Smeariness | Slip/Drag | Additional Tactile Comments |
|---|---|---|---|---|---|---|---|
| Example 1C Blend 75/25 silicone/acrylic | Very good wetting. Gloss equal to or slightly better than Commercial Protectant D. | 1 | 2–3 | 2–3 | 3–4 | 1 | Tacky feel when tapped. Dry feel when rubbed. Mars with a very hard rub and does not heal quickly. |

TABLE 2

Example 2

| Sample Description | Application and Appearance Comments | Dryness | Residue Transfer | Tackiness | Smeariness | Slip/Drag | Additional Tactile Comments |
|---|---|---|---|---|---|---|---|
| Silicone Emulsion | Good wetting. Gloss same as Commercial Protectant A. | 5 | 5 | 1 | 1 | 2 | Very Oily/greasy feel. |
| Acrylic Terpolymer Emulsion | Very poor wetting initially, but quickly absorbs into substrate and substrate looks completely matte. With continued wiping, gloss develops. Difficult to spread/wipe into a uniform film. 15 minutes after application, gloss was about the same as Commercial Protectant B, but film had a silvery/white tint. | 1 | 1 | 4 | 2–3 | 4 | Very dry and very draggy feel. Somewhat smeary. |
| Example 2A Blend 25/75 silicone/acrylic | Very poor wetting initially, but quickly absorbs into substrate and substrate looks completely matte. With continued wiping, gloss develops. Difficult to spread/wipe into a uniform film. 15 minutes after application, gloss was slightly higher than Commercial Protectant A. | 2 | 3 | 3 | 1–2 | 3 | Drier feel than Silicone Emulsion, but slightly oily. |
| Example 2B Blend 50/50 silicone/acrylic | Poor wetting initially, but quickly absorbs into substrate and substrate looks completely matte. With continued wiping, gloss develops. Easier to wipe into a uniform film than the acrylic polymer emulsion alone or the 25/75 silicone/acrylic blend. 15 minutes after application, gloss was slightly higher than Commercial Protectant A. | 2 | 4 | 1–2 | 1 | 1 | Drier feel than Silicone Emulsion, but slightly oily. |
| Example 2C Blend 75/25 silicone/acrylic | Fair wetting initially, but quickly absorbs into substrate and substrate looks completely matte. With continued wiping, glass develops. Easy to wipe into a uniform film. 15 minutes after application, gloss was the same as Commercial Protectant A. | 2 | 4 | 1 | 1 | 1 | Drier feel than Silicone Emulsion, but slightly oily. |

TABLE 3

Example 3

| Sample Description | Application and Appearance Comments | Dryness | Residue Transfer | Tackiness | Smeariness | Slip/Drag | Additional Tactile Comments |
|---|---|---|---|---|---|---|---|
| Silicone Microemulsion | Very good wetting. Gloss same as or better than Commercial Protectant B. | 5 | 5 | 2 | 3 | 2 | Noticeable tap and rub marks left, but they heal fairly quickly. Feels oily/greasy. Large quantity of residue transfer. |
| Acrylic RC Emulsion | Poor wetting. Somewhat difficult to spread. Requires extensive wiping to achieve a uniform film. Gloss about same as Commercial Protectant B, but film has a silvery-white tint instead of a black tint. | 1 | 1 | 1 | 1 | 3–4 | Feels very dry. No observable residue transferred to untreated vinyl, but some white residue comes off on finger. |
| Example 3A Blend 25/75 silicone/acrylic | Fair to good wetting. Spreads fairly easily. Gloss between as Commercial Protectant A and Commercial Protectant B. | 1 | 1 | 1 | 1 | 1 | Feels very dry. Slight mark left with very hard rub. |
| Example 3B Blend 50/50 silicone/acrylic | Fair to good wetting. Spreads fairly easily. Gloss about same as Commercial Protectant A. | 1 | 1–2 | 1 | 1 | 1 | Feels very dry. Marks left with firm press and very hard rub. |

TABLE 3-continued

Example 3

| Sample Description | Application and Appearance Comments | Dryness | Residue Transfer | Tackiness | Smeariness | Slip/Drag | Additional Tactile Comments |
|---|---|---|---|---|---|---|---|
| Example 3C Blend 75/25 silicone/acrylic | Good wetting. Spreads fairly easily. Gloss about same as Commercial Protectant B. | 1 | 4 | 2–3 | 4 | 2–3 | Feels dry when rubbed, but sticky when tapped. |

Other variations and modifications may be made in the compositions and methods described without departing from the essential features of my invention, the forms of which are only exemplary and not limitations on its scope defined in the claims.

What which is claimed is:

1. A method of providing a protective finish to a rubber or vinyl substrate comprising covering the rubber or vinyl substrate with a protectant composition comprising (A) a silicone component selected from the group consisting of (i) an aqueous emulsion containing a polysiloxane stabilized in the emulsion by a nonionic surfactant, the polysiloxane in the emulsion having a particle diameter greater than 140 nanometers (0.14 micrometer) and less than 350 nanometers (0.35 micrometer), (ii) an aqueous emulsion containing an emulsion polymerized polysiloxane stabilized in the emulsion by a nonionic surfactant and an ionic surfactant, the polysiloxane in the emulsion having a particle diameter greater than 140 nanometers (0.14 micrometer), and (iii) an aqueous microemulsion containing an emulsion polymerized polysiloxane stabilized in the microemulsion by a nonionic surfactant and an ionic surfactant, the polysiloxane in the microemulsion having a particle diameter less than 140 nanometers (0.14 micrometer); and (B) an acrylic component selected from the group consisting of acrylic polymer emulsions, acrylic polymer solutions, acrylic pollymer colloidal solutions, acrylic polymer dispersions, and acrylic pollymer colloidal dispersions; the acrylic component and the silicone component being blended together to yield a polysiloxane/acrylic polymer ratio of 10:90 to 90:10 on a weight basis.

2. A method according to claim 1 in which emulsion (A)(i) contains 20–60% by weight of polysiloxane, 0.01–15% by weight of nonionic surfactant, based on the weight of the emulsion, the balance water; and emulsion (A)(ii) and microemulsion (A)(iii) contain 10–70% by weight of polysiloxane, 0.5–30% by weight of nonionic surfactant, 0.05–30% by weight of ionic surfactant, based on the weight of the emulsion and the microemulsion, respectively, the balance water.

3. A method according to claim 2 in which the nonionic surfactant in emulsion (A)(i) is an ethoxylated alcohol; and the acrylic component in the protectant composition is an acrylic polymer emulsion containing a terpolymer formed from (i) an olefinically unsaturated carboxylic acid monomer, (ii) an acrylate or methacrylate ester monomer, and (iii) an unsaturated aromatic monomer.

4. A method according to claim 3 in which the acrylic polymer emulsion contains a butylacrylate/styrene/methacrylic acid terpolymer.

5. A method according to claim 2 in which the nonionic surfactant in emulsion (A)(ii) and microemulsion (A)(iii) is a polyoxyethylene fatty alcohol; the ionic surfactant is an alkylarylsulfonate having one or more alkyl groups of 8 or more carbon atoms; and the acrylic component in the protectant composition is an aqueous solution containing 30% by weight of an acrylic polymer based on the weight of the solution.

* * * * *